United States Patent
Zhang et al.

(10) Patent No.: US 12,461,773 B2
(45) Date of Patent: Nov. 4, 2025

(54) VIRTUAL MACHINE OPERATION CONTROLLING METHOD, APPARATUS, DEVICE AND MEDIUM

(71) Applicant: Beijing Volcano Engine Technology Co., Ltd., Beijing (CN)

(72) Inventors: Yang Zhang, Beijing (CN); Zhimin Feng, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/745,895

(22) Filed: Jun. 17, 2024

(65) Prior Publication Data

US 2024/0419479 A1 Dec. 19, 2024

(30) Foreign Application Priority Data

Jun. 19, 2023 (CN) .......................... 202310731722.3

(51) Int. Cl.
*G06F 9/455* (2018.01)

(52) U.S. Cl.
CPC .............. *G06F 9/45558* (2013.01); *G06F 2009/45562* (2013.01); *G06F 2009/4557* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 10,635,997 B1 * | 4/2020 | Roth | .................. H04L 41/5051 |
| 2014/0068608 A1 | 3/2014 | Kulkarni | |
| 2014/0165063 A1 | 6/2014 | Shiva et al. | |
| 2015/0135003 A1 * | 5/2015 | Cota-Robles | ............ G06F 9/50 714/6.3 |

(Continued)

FOREIGN PATENT DOCUMENTS

| | | |
|---|---|---|
| CN | 104808770 A | 7/2015 |
| CN | 109189545 A | 1/2019 |

OTHER PUBLICATIONS

Extended European Search Report for European Patent Application No. 24176842.3, mailed on Nov. 19, 2024, 11 pages.

(Continued)

*Primary Examiner* — Bradley A Teets
*Assistant Examiner* — Melissa A Headly
(74) *Attorney, Agent, or Firm* — Astute IP Law Group

(57) ABSTRACT

The embodiments of the present disclosure provide a virtual machine operation controlling method, an apparatus, a device and a medium. The method comprises: creating a target virtual machine, wherein an upper limit of a processor operating frequency of the target virtual machine is set as a target frequency; in an event that a processor utilization rate of a first physical machine exceeds a preset threshold, obtaining sleep levels corresponding to processors in an idle state on other physical machines, and determining a second physical machine satisfying a preset handover condition from a server cluster, migrating the target virtual machine from the first physical machine to the second physical machine, and performing, based on the target frequency, turbo processing on a processor in an operating state on the target virtual machine.

21 Claims, 5 Drawing Sheets

(56) References Cited

U.S. PATENT DOCUMENTS

| | | | |
|---|---|---|---|
| 2016/0070597 A1* | 3/2016 | Riggin | G06F 9/45558 718/1 |
| 2016/0196157 A1* | 7/2016 | Kodama | H04L 43/04 718/1 |
| 2016/0252943 A1 | 9/2016 | Varma et al. | |
| 2020/0183722 A1* | 6/2020 | Kumar | G06F 9/45558 |
| 2022/0214917 A1* | 7/2022 | Chien | G06F 9/45558 |

OTHER PUBLICATIONS

Ifflander L., et al., "Heat-aware Load Balancing—Is it a Thing", Softwaretechnik-Trends Band 40, Heft 3, XP093218439, Retrieved from the Internet URL: https://fb-swt.gi.de/fileadmin/FB/SWT/Softwaretechnik-Trends/Verzeichnis/Band_40_Heft_3/SSP2020_Ifflaender.pdf, Nov. 13, 2020, 3 pages.

Anonymous, "Load Balancing (Computing)—Wikipedia", XP093218539, Retrieved from the Internet URL:https://en.wikipedia.org/w/index.php?title=Loadbalancing(computing)oldid=1147253870, Mar. 29, 2023, 16 pages.

First office Action for Chinese Patent Application No. 202310731722.3, mailed on Apr. 27, 2025, 10 pages.

\* cited by examiner

VIRTUAL MACHINE OPERATION CONTROLLING METHOD, APPARATUS, DEVICE AND MEDIUM

CROSS-REFERENCE TO RELATED APPLICATION(S)

This application claims priority to Chinese Application No. 202310731722.3 filed on Jun. 19, 2023, the disclosure of which is incorporated herein by reference in its entity.

FIELD

The present disclosure relates to the technical field of communications, in particular a virtual machine operation controlling method and an apparatus, a device and a medium.

BACKGROUND

A processor (e.g. Central Processing Unit (CPU)) typically provides a turbo capacity that supports the processor to run at an actual operation frequency greater than its base frequency. For example, if the base frequency of a processor is 2.x GHz, the turbo capacity enables it to operate at a frequency of 3.x GHz. The turbo capacity may include a single-core turbo frequency and an all-core turbo frequency. The processor is typically a multi-core processor including a primary core and a plurality of secondary cores, the single-core turbo frequency refers to an operating frequency that a single core can reach, and the all-core turbo frequency refers to an operating frequency that a processor can reach when all cores are running. Due to the constraints of the thermal design power consumption and the number of cores of the processor, the all-core turbo frequency is generally lower than the single-core turbo frequency. For example, even if the single-core turbo frequency is 3.8 GHz (in a specific scenario), the all-core turbo frequency may only reach 3.1 GHz.

In the related technologies, when a processor corresponding to a virtual machine is created on a physical machine for a user, the maximum frequency of the processor is limited to a relatively low turbo frequency, for example, the all-core turbo frequency, leading to poor performance of the processor.

However, due to the different operating states of the processors corresponding to respective virtual machines on different physical machines, the load utilization rates of the processors are varied. Therefore, there is a need for creating a high-performance virtual machine based on a processor with a higher turbo capability, to improve the performance of the processors of the virtual machine while sufficiently utilizing the processing resources.

SUMMARY

In order to solve, or at least partly solve, the above technical problem, the present disclosure provides a virtual machine operation controlling method and an apparatus, a device and a medium, so as to improve performance of the virtual machine while increasing the resource utilization rate of processors.

Embodiments of the present disclosure provide a virtual machine operation controlling method, comprising: in response to a creation request of a target virtual machine, creating the target virtual machine based on at least one processor on a first physical machine in a server cluster, wherein an upper limit of a processor operating frequency of the target virtual machine is set as a target frequency; monitoring a processor utilization rate of processors in an operating state of the first physical machine, and in an event that the processor utilization rate of the first physical machine exceeds a preset threshold, selecting a second physical machine satisfying a preset handover condition from the server cluster based on sleep levels corresponding to processors in an idle state on other physical machines in the server cluster, wherein the preset handover condition is that a sleep power consumption corresponding to processors in an idle state on a physical machine meets a preset heat release index that reflects a processor in an operating state has a turbo capability; migrating the target virtual machine from the first physical machine to the second physical machine, and performing, based on the target frequency, turbo processing on a processor in an operating state on the target virtual machine.

Embodiments of the present disclosure further provide a virtual machine operation controlling apparatus, comprising:
a creating module configured to create a target virtual machine based on at least one processor on a first physical machine in a server cluster in response to a creation request of the target virtual machine, wherein an upper limit of a processor operating frequency of the target virtual machine is set as a target frequency; a monitoring module configured to monitor a processor utilization rate of processors in an operating state of the first physical machine is in an operating state, a determining module configured to select a second physical machine satisfying a preset handover condition from the server cluster based on sleep levels corresponding to processors in an idle state on other physical machines in the server cluster in an event that the processor utilization rate of the first physical machine exceeds a preset threshold, wherein the preset handover condition is that a sleep power consumption corresponding to processors in an idle state on a physical machine meets a preset heat release index that reflects a processor in an operating state has a turbo capability; and a processing module configured to migrate the target virtual machine from the first physical machine to the second physical machine, and perform, based on the target frequency, turbo processing on a processor in an operating state on the target virtual machine.

Embodiments of the present disclosure also provide an electronic device, comprising: a processor; a memory for storing executable instructions by the processor; wherein the processor is configured to read the executable instructions from the memory and execute the executable instructions to implement the virtual machine operation controlling method of the embodiments of the present disclosure.

Embodiments of the present application further provide a computer readable storage medium, wherein the computer readable storage medium stores computer programs configured to perform the virtual machine operation controlling method of the embodiments of the present disclosure.

As compared with the prior art, the technical solution according to the embodiments of the present disclosure has the following advantages:

The virtual machine operation control solution according to the embodiments of the present disclosure includes: in response to a creation request of a target virtual machine, creating the target virtual machine based on at least one processor on a first physical machine in a server cluster, wherein an upper limit of a processor operating frequency of the target virtual machine is set as a target frequency; monitoring a processor utilization rate of processors in an operating state of the first physical machine, and in an event of obtaining that the processor utilization rate of the first physical machine exceeds a preset threshold, selecting a second physical machine satisfying a preset handover condition from the server cluster based on sleep levels corresponding to processors in an idle state on other physical machines in the server cluster, wherein the preset handover condition is that a sleep power consumption corresponding to processors in an idle state on a physical machine meets a preset heat release index that reflects a processor in an operating state has a turbo capability; migrating the target virtual machine from the first physical machine to the second physical machine, and performing, based on the target frequency, turbo processing on a processor in an operating state on the target virtual machine. The technical solution can improve the performance of the virtual machine while increasing the resource utilization rate of the processors.

BRIEF DESCRIPTION OF THE DRAWINGS

The above and other objectives, features and advantages of the present disclosure will become more apparent, through the following implementations with reference to the accompanying drawings. Throughout the drawings, the same or similar reference symbols refer to the same or similar components. It would be appreciated that the drawings are provided exemplarily, where the components and elements are not necessarily drawn to scale.

DETAILED DESCRIPTION OF EMBODIMENTS

Reference now will be made to the drawings to describe in detail the embodiments of the present disclosure. Although the drawings show some embodiments of the present disclosure, the present disclosure can be implemented in various forms, which should not be construed as being confined to the embodiments illustrated therein. Instead, those embodiments are provided to enable those skilled in the art to understand the present disclosure more thoroughly and completely. It is to be understood that the drawings and embodiments of the present disclosure are provided only as examples, without suggesting any limitation to the protection scope of the present disclosure.

It would be appreciated that respective steps in the implementations of the method according to the present disclosure may be performed in different orders and/or performed in parallel. In addition, the method implementations may include additional steps and/or steps omitted. The scope of the present disclosure is not limited thereto.

As used herein, the term "includes" and its variants are to be read as open-ended terms that mean "includes, but is not limited to." The term "based on" is to be read as "based at least in part on." The term "an embodiment" is to be read as "at least one embodiment;" the term "another embodiment" is to be read as "at least one further embodiment;" the term "some embodiments" is to be read as "at least some embodiments." Related definitions of other terms will be provided in the description below.

It should be noted that, the terms "first," "second" and the like mentioned in the present disclosure are only used to distinguish different apparatuses, modules or units, rather than limit an order of functions performed by the apparatus, module or unit or limit interdependence.

It should be noted that, the terms "one" and "a plurality of" mentioned in the present disclosure are illustrative, not restrictive, and should be understood as "at least one" by those skilled in the art, unless explicitly specified otherwise in the context.

Names of messages or information interacted between a plurality of apparatuses in the embodiments of the present disclosure are illustrative rather than limit the scope of the messages or information.

In order to solve the above-mentioned problem, embodiments of the present disclosure provide a virtual machine operation controlling method, including: determining a processor with a high turbo capability based on operating states of processors corresponding to respective virtual machines on physical machines; and creating a high-performance virtual machine based on the processors. In this way, the present disclosure can sufficiently utilize processing resources of processors while improving performance of the processors corresponding to the virtual machine.

Hereinafter, the method will be introduced with reference to the embodiments.

Figure 1:
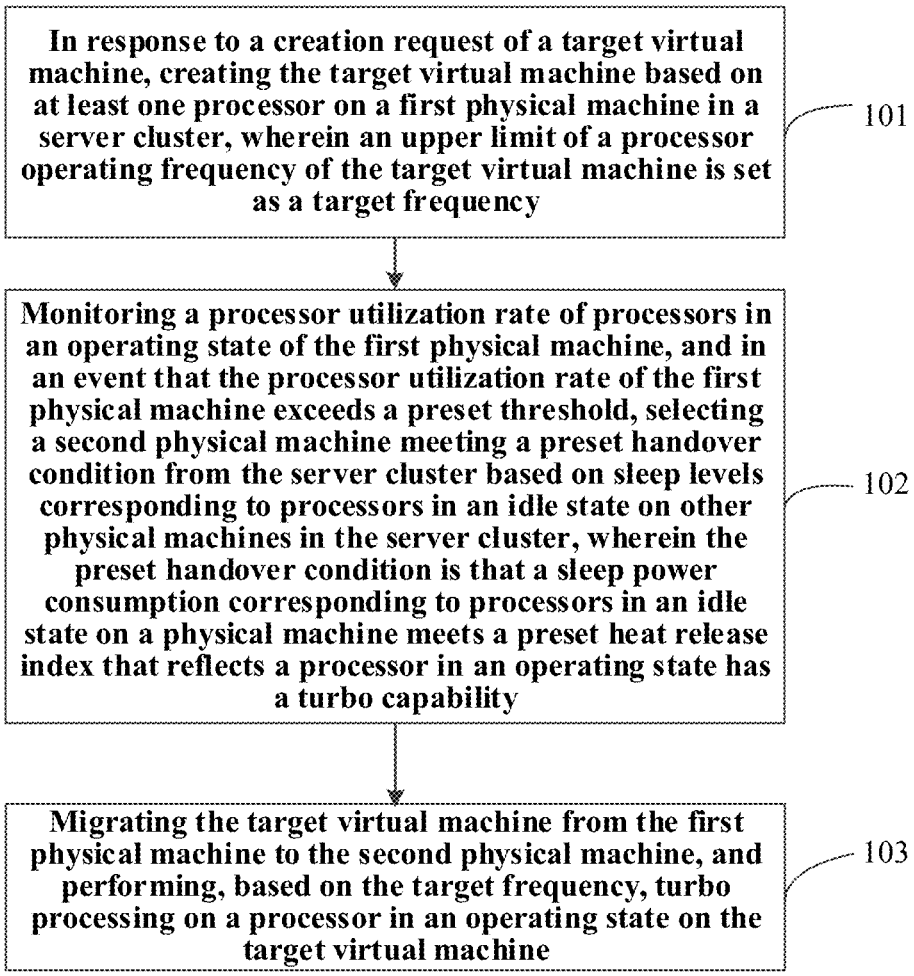
FIG. 1 illustrates a flowchart of a virtual machine operation controlling method provided by embodiments of the present disclosure.

FIG. 1 illustrates a flowchart of a virtual machine operation controlling method provided by embodiments of the present disclosure. The method can be performed by a virtual machine operation controlling apparatus which can be implemented using software and/or hardware, and which is typically integrated in an electronic device. As shown therein, the method includes:

Step 101: in response to a creation request of a target virtual machine, creating the target virtual machine based on at least one processor on a first physical machine in a server cluster, wherein an upper limit of a processor operating frequency of the target virtual machine is set as a target frequency.

Figure 2:
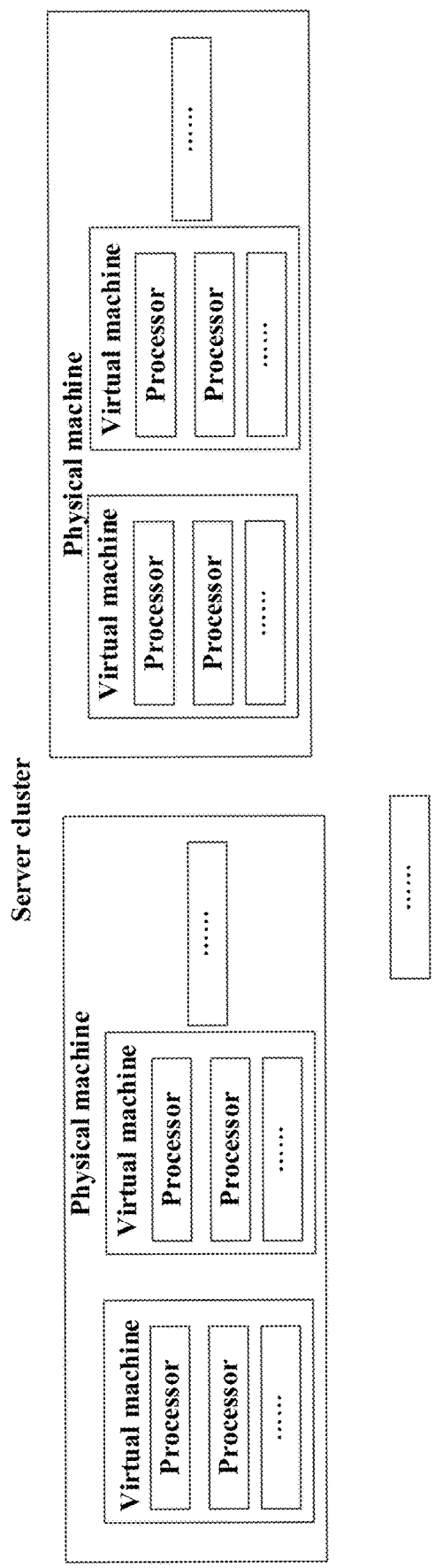
FIG. 2 illustrates a schematic diagram of an architecture of a server cluster provided by embodiments of the present disclosure.

As shown in FIG. 2, a server cluster may be understood as a cloud platform and the like, which may include a plurality of physical machines. In each physical machine, a plurality of virtual machines may be created, each of which may include a plurality of processors each including a multi-core processor or the like.

In the embodiments of the present disclosure, a creation request of a target virtual machine is obtained, which may be initiated by a client when required. In response to the creation request of the target virtual machine, the target virtual machine is created based on at least one processor on a first physical machine in a server cluster, where an upper limit of a processor operating frequency of the target virtual machine is set as a target frequency. The target frequency may be read as a high turbo frequency, for example, a single-core turbo frequency that a single core can reach.

In some possible embodiments, a creation request of a virtual machine is received, where the creation request comprises: a processor number and a processor performance type. Wherein, the processor performance type may include a type corresponding to the upper limit of the processor operating frequency corresponding to the virtual machine. For example, the processor performance type may include a base frequency type, a single-core turbo frequency, an all-core turbo frequency and the like.

During an actual execution, the processor performance type may be identified in different ways, which may be, for example, a word identifier, a number identifier or the like. In an embodiment, whether the processor performance type is a target type is determined, where the target type indicates that an upper limit of a processor operating frequency corresponding to a virtual machine to be configured is set as the target frequency, i.e., the target type indicates that the processor operating frequency can reach a higher turbo frequency, for example, a single-core turbo frequency or the like. Then, processors matching the number of processors are selected on the first physical machine, to create the respective high-performance target virtual machine.

Step 102: monitoring a processor utilization rate of processors in an operating state of the first physical machine, and in an event that the processor utilization rate of the first physical machine exceeds a preset threshold, selecting a second physical machine satisfying a preset handover condition from the server cluster based on sleep levels corresponding to processors in an idle state on other physical machines in the server cluster, wherein the preset handover condition is that a sleep power consumption corresponding to processors in an idle state on a physical machine meets a preset heat release index that reflects a processor in an operating state has a turbo capability.

It would be appreciated that, even though the upper limit of the processor operating frequency of the target virtual machine is set as the target frequency, it does not mean that the processor meets the condition of operating at the target frequency. Therefore, in order to guarantee sufficient utilization of processing resources of processors, an embodiment of the present application further provides monitoring the utilization rate of the processors in an operating state of the first physical machine in the server cluster, and comparing the utilization rate with a preset threshold, to determine, based on the comparison result, whether the target virtual machine meets the condition of operating at the target frequency.

In an embodiment of the present disclosure, if the processor utilization rate of the first physical machine exceeds the preset threshold, it is indicated that the first physical machine may have an exceedingly high load, the operation resources on the first physical machine cannot support the target virtual machine to operate at the target frequency, and the processors in the operating state on the first physical machine do not have the turbo capability. In the case, sleep levels corresponding to processors in an idle state on other physical machines in the server cluster are obtained, wherein the sleeve level is used to identify a wake time of waking a respective processor from a sleep state to an operating state. A higher sleep level indicates a longer wake time of waking a processor from the sleep state to the operating state, and correspondingly a lower sleep power consumption. If a processor in an idle state on other physical machines has a higher sleep level, it is indicated that the processor occupies fewer operation resources (lower sleep power consumption). Therefore, in this embodiment, a second physical machine satisfying a preset handover condition is determined from the server cluster based on the sleep levels, wherein the preset handover condition is that a sleep power consumption corresponding to processors in an idle state on a physical machine meets a preset heat release index that reflects a processor in an operating state has a turbo capability, i.e., a capability of supporting the target processor to operate at a target frequency on the second physical machine.

It is to be noted that, in different application scenarios, the sleep levels corresponding to the processors in the idle state on other physical machines can be obtained in different ways, which will be described below exemplarily:

In some possible embodiments, after creating the virtual machine corresponding to processors on a physical machine in the server cluster, candidate sleep levels which are supportable when the processors are in the idle state are reported to the virtual machine, wherein a model of a processor can be identified by a related drive component, and a preset corresponding relationship is queried based on the type, to determine the supportable candidate sleep levels; then, sleep levels are received, which are sent by virtual machines on the other physical machines when detecting that corresponding processors are in the idle state, wherein the sleep levels are determined by the respective virtual machines based on the candidate sleep levels and an operating service. The specific determining manner could be set according to the scenario, which will not be exhausted herein.

Step 104: migrating the target virtual machine from the first physical machine to the second physical machine, and performing, based on the target frequency, turbo processing on a processor in an operating state on the target virtual machine.

In an embodiment of the present disclosure, since the processors in the operating state on the second physical machine have the turbo capability, in order to guarantee high-performance operation of the target virtual machine, the target virtual machine is migrated from the first physical machine to the second physical machine, and turbo processing is performed on a processor in an operating state on the target virtual machine, based on the target frequency. The processor after subjected to the turbo processing has a high operating frequency that is typically greater than an all-core frequency, for example, a single-core turbo frequency greater than the all-core frequency. Therefore, in combination with the processor utilization rate of the first physical machine and the sleep power consumptions of other physical machines, when there is a high load on the first physical machine, dynamic live migration from the target virtual machine to the second physical machine can be implemented, and thus ensuring that the target virtual machine can operate with high performance while increasing the processing resource utilization rate of the target virtual machine.

Generally, the virtual machine operation controlling method according to the embodiments of the present disclosure comprises: in response to a creation request of a target virtual machine, creating the target virtual machine based on at least one processor on a first physical machine in a server cluster, wherein an upper limit of a processor operating frequency of the target virtual machine is set as a target frequency; monitoring a processor utilization rate of processors in an operating state of the first physical machine, and in an event of obtaining that the processor utilization rate of the first physical machine exceeds a preset threshold, selecting a second physical machine satisfying a preset handover condition from the server cluster based on sleep levels corresponding to processors in an idle state on other physical machines in the server cluster, wherein the preset handover condition is that a sleep power consumption corresponding to processors in an idle state on a physical machine meets a preset heat release index that reflects a processor in an operating state has a turbo capability; migrating the target virtual machine from the first physical machine to the second physical machine, and performing, based on the target frequency, turbo processing on a processor in an operating state on the target virtual machine. The technical solution can improve the performance of the virtual machine while increasing the resource utilization rate of the processors.

In an embodiment of the present disclosure, after monitoring the processor utilization rate of the processors in the operating state of the first physical machine and comparing the processor utilization rate with the preset threshold, if the processor utilization rate of the first physical machine is less than the preset threshold, it is indicated that the load of the first physical machine may not be great, and maximization of the processor performance of the target virtual machine may be supported. In order to determine whether to perform, based on the target frequency, turbo processing on a processor in an operating state on the target virtual machine, whether the sleep levels corresponding to the processors in the idle state on the first physical machine meet the preset handover condition is also detected, wherein the preset handover condition is a preset heat release index released by processors in the idle state on the physical machine, i.e., in further combination with the sleep power consumption of the first physical machine, whether the first physical machine can perform turbo processing on a processor in the operating state on the virtual machine, based on the target frequency, can be determined. The heat release index reflects that a processor in the operating state has a turbo capability.

Further, if the sleep power consumption released by the sleep levels corresponding to the processors in the idle state on the first physical machine does not meet the preset handover condition, it is indicated that the first physical machine cannot perform turbo processing on the processors in the operating state on the virtual machine based on the target frequency. Therefore, it is still needed to determine a second physical machine in the server cluster.

On the contrary, if the sleep power consumption released by the sleep levels corresponding to the processors in the idle state on the first physical machine meets the preset handover condition, it is determined that the first physical machine can perform turbo processing on the processors in the operating state on the virtual machine based on the target frequency, and perform turbo processing on the processor in the operating state on the target virtual machine based on the target frequency.

In some possible embodiments, in order to detect whether the sleep power consumption released by the sleep levels corresponding to the processors in the idle state on the first physical machine meets the heat release index (i.e., to detect whether the processors in the idle state on the physical machine meet the preset handover condition mentioned in the above-mentioned embodiments), setting information of the sleep levels of the processors on the first physical machine (i.e., setting information stored in advance on the first physical machine) can be obtained, where the setting information has stored therein sleep level information of the processors on the first physical machine, which may be actively reported by the processors, or may be actively obtained by the first physical machine, or the like. In different application scenarios, different methods for controlling the processors to enter the sleep level are employed. For example, related drives may be used to control a processor (a CPU in the embodiment) to enter a sleep level (a C-state used to identify the sleep level in the embodiment). There are two drives for causing a CPU of a model A to enter different C-states, specifically an intel_idle drive and an acpi_idle drive. The intel_idle drive determines the C-state accessible by the CPU by identifying the model of the CPU (the kernel maintains a C-state mapping table supported by different models of CPUs). Every time when a new model of CPU is released, the kernel needs to adapt to the CPU to identify the C-state information supported by the CPU of this model. Considering the actual application scenario, a client generally does not upgrade the related client mirror to the latest kernel (for compatibility and stability considerations). In the case, the intel_idle drive cannot operate normally. By contrast, the acpi_idle drive adjusts the CPU in the idle state to enter a different C-state by determining whether an ACPI table provides the C-state information. Therefore, as long as the supported C-state is reported on the virtualization layer, the process does not require client intervention. For example, the Linux operating system first loads the intel_idle drive by default. If the intel_idle drive does not work, the acpi-idle drive will be loaded again. Therefore, as long as one of the two drives can operate normally, the CPU in the idle state can be set to enter a C-state within the client, and so on.

After obtaining the setting information, whether the processor sleep level is limited as a first sleep level is determined based on the setting information, wherein the first sleep level identifier indicates respective processors in the operating state do not have a turbo capability. For example, when the preset sleep levels are C1, C2, C3, C4, C5 and C6 according to scores from low to high, where the first sleep level may be other sleep level than C1. If a processor sleep level is limited as the first sleep level, it is indicated that the respective processors do not have the turbo capability as the processors in the operating state do. In the case, the sleep level corresponding to the processors in the idle state on the first physical machine meets the preset handover condition.

Otherwise, if the processor sleep level is not limited as the first sleep level (for example, the processor sleep level is limited to the C1 level), the sleep level corresponding to the processors in the idle state on the first physical machine is obtained, and a preset corresponding relationship between the sleep level and the sleep power consumption is obtained. Then, based on the corresponding relationship between the sleep level and the sleep power consumption, a target sleep level to be detected and a corresponding proportion threshold are determined, where the target sleep level may be a deep sleep level, for example, C6, and the power consumption corresponding to the target sleep level is low. Accordingly, the proportion threshold is used to limit a number of processors in the target sleep level, to avoid a great sleep power consumption when there is a small number of processors in the target sleep level, which may cause a failure in performing turbo processing on the first physical machine.

In the embodiment, a proportion result between processors corresponding to the target sleep level on the first physical machine and processors in the idle state is detected, and the proportion result is compared with the proportion threshold. If the proportion result is less than the proportion threshold, it is determined that the sleep level corresponding to the processors in the idle state on the first physical machine meets the preset handover condition. If the proportion result is greater than or equal to the proportion threshold, it is determined that the sleep level corresponding to the processors in the idle state on the first physical machine does not meet the preset handover condition.

Generally, the virtual machine operation controlling method according to the embodiments of the present disclosure, in combination with the sleep power consumption released by the sleep level corresponding to the processors in the idle state on the first physical machine, and the processor utilization rate on the first physical machine, whether the processor in the operating state on the target virtual machine has a turbo capability is determined. If the processor in the operating state on the target virtual machine has the turbo capability, turbo processing is performed on the processor in the operating state on the target virtual machine, to improve the processing resource utilization rate of the processor in the operating state on the target virtual machine.

According to the above embodiments, in order to sufficiently guarantee that the processing resources of the processor can be utilized to a greater extent, if the first physical machine does not support the turbo processing to be performed on the processor in the operating state on the target virtual machine, the target virtual machine can be migrated to a second physical machine for turbo processing. Hereinafter, reference will be made to embodiments to describe in detail how the second physical machine is determined.

In an embodiment of the present disclosure, a sleep level of processors in the idle state on other physical machines in the server cluster is obtained, and a second physical machine is determined based on the sleep level.

Figure 3:
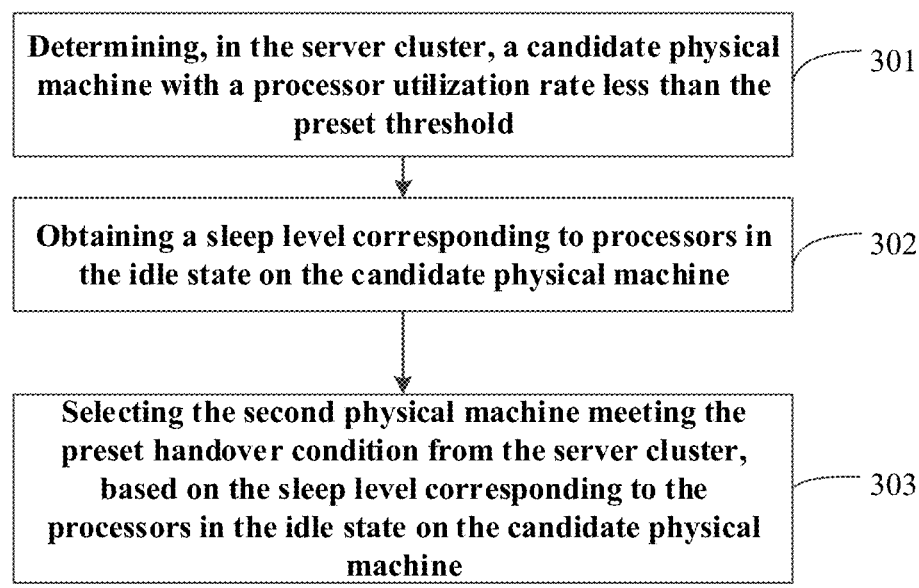
FIG. 3 illustrates a flowchart of a further virtual machine operation controlling method provided by embodiments of the present disclosure.

FIG. 3 illustrates a flowchart of a further virtual machine operation controlling method provided by embodiments of the present disclosure. As shown therein, the method includes:

Step 301: determining, in the server cluster, a candidate physical machine with a processor utilization rate less than the preset threshold.

In an embodiment of the present disclosure, a candidate physical machine with a processor utilization rate less than the preset threshold is determined. As the processor utilization rate of the candidate physical machine is less than the preset threshold, the load thereof is relatively low, and the candidate physical machine may support the turbo processing of the target virtual machine.

It is to be noted that, in different application scenarios, determining, in the server cluster, a candidate physical machine with a processor utilization rate less than the preset threshold can be implemented in various ways, which will be described exemplarily below:

In some possible embodiments, a processor utilization rate corresponding to the target virtual machine in the first physical machine can be obtained, and whether the processor utilization rate corresponding to the target virtual machine is greater than a preset first threshold can be detected, where the first threshold is adjusted according to the scenario, and where the first threshold is greater than the preset threshold. If the processor utilization rate corresponding to the target virtual machine is greater than the first threshold, it is indicated that the utilization rate of the processors in the target virtual machine is greater than the utilization rate corresponding to the preset threshold. In the case, if the processor utilization rate corresponding to the target virtual machine is greater than the first threshold, a second threshold is determined based on the processor utilization rate corresponding to the target virtual machine, where the second threshold is less than the preset threshold, and a difference between the first threshold and the second threshold is greater than a preset threshold. That is, if the utilization rate of the processors in the target virtual machine is greater than the utilization rate corresponding to the preset threshold, a second threshold of the processor utilization rate less than the utilization rate corresponding to the preset threshold is determined. The processor utilization rates of other physical machines in the server cluster are compared with the preset second threshold, and a candidate physical machine with the processor utilization rate less than the second threshold is determined in other physical machines, i.e., further determines that a candidate physical machine with a smaller processor utilization rate with respect to the utilization rate corresponding to the preset threshold.

In some possible embodiments, the processor utilization rate corresponding to the target virtual machine in the first physical machine are obtained; a first difference between the processor utilization rate and the preset threshold is calculated; the processor utilization rates of other physical machines in the server cluster are compared with the preset threshold, and initial candidate physical machines each with a processor utilization rate less than the preset threshold are determined; then, a second difference between the preset threshold and the processor utilization rate of each initial candidate physical machine is calculated; a third difference between the second difference and the first difference is calculated, and the initial candidate physical machine with a third difference greater than a preset difference threshold is determined as a finally determined candidate physical machine.

Step 302: obtaining a sleep level corresponding to processors in the idle state on the candidate physical machine.

Step 303: selecting the second physical machine satisfying the preset handover condition from the server cluster, based on the sleep level corresponding to the processors in the idle state on the candidate physical machine.

After determining the candidate physical machines, in order to further filter from the candidate physical machines a second physical machine that supports turbo processing of the target virtual machine, the sleep level corresponding to processors in the idle state on each physical machine, to filter a second physical machine satisfying the preset handover condition based on the sleep levels of the candidate physical machines. Wherein, a target sleep level to be detected and a corresponding proportion threshold are determined based on a corresponding relationship between a sleep level and a sleep power consumption, where the target sleep level may be a deep sleep level, for example, C6, and the sleep power consumption corresponding to the target sleep level is low. As such, the proportion threshold corresponding to the target sleep level needs to be identified according to the scenario, and the proportion result between the processors corresponding to the target sleep level and the processors in the idle state on the candidate physical machine is detected. If the proportion result is greater than the proportion threshold, it is indicated that candidate physical machine has a low sleep power consumption.

On the contrary, if the proportion result is less than the proportion threshold, it is indicated that the candidate physical machine has a high sleep power consumption. Therefore, in the embodiment, the proportion result is compared with the proportion threshold, and a target candidate physical machine is determined based on the comparison result, wherein the proportion result corresponding to the target candidate physical machine is greater than the proportion threshold, i.e., most of the processors in the idle state in the target candidate physical machine are in the target sleep level which incurs a low sleep power consumption. Then, at least one of the target candidate physical machines is determined as the second physical machine satisfying the preset handover condition. For example, one of the target candidate physical machines is determined randomly as the second physical machine. For another example, a plurality of the target candidate physical machines is determined as the second physical machines.

In order to give those skilled in the art a more comprehensive picture of the processor performance adjustment process according to the embodiments of the present disclosure, description below will be made with reference to a specific embodiment, where the target frequency is a single-core turbo frequency greater than 3.1 GHZ, an all-core turbo frequency is 3.1 GHZ, and a target sleep level is the deep sleep level C6.

Figure 4:
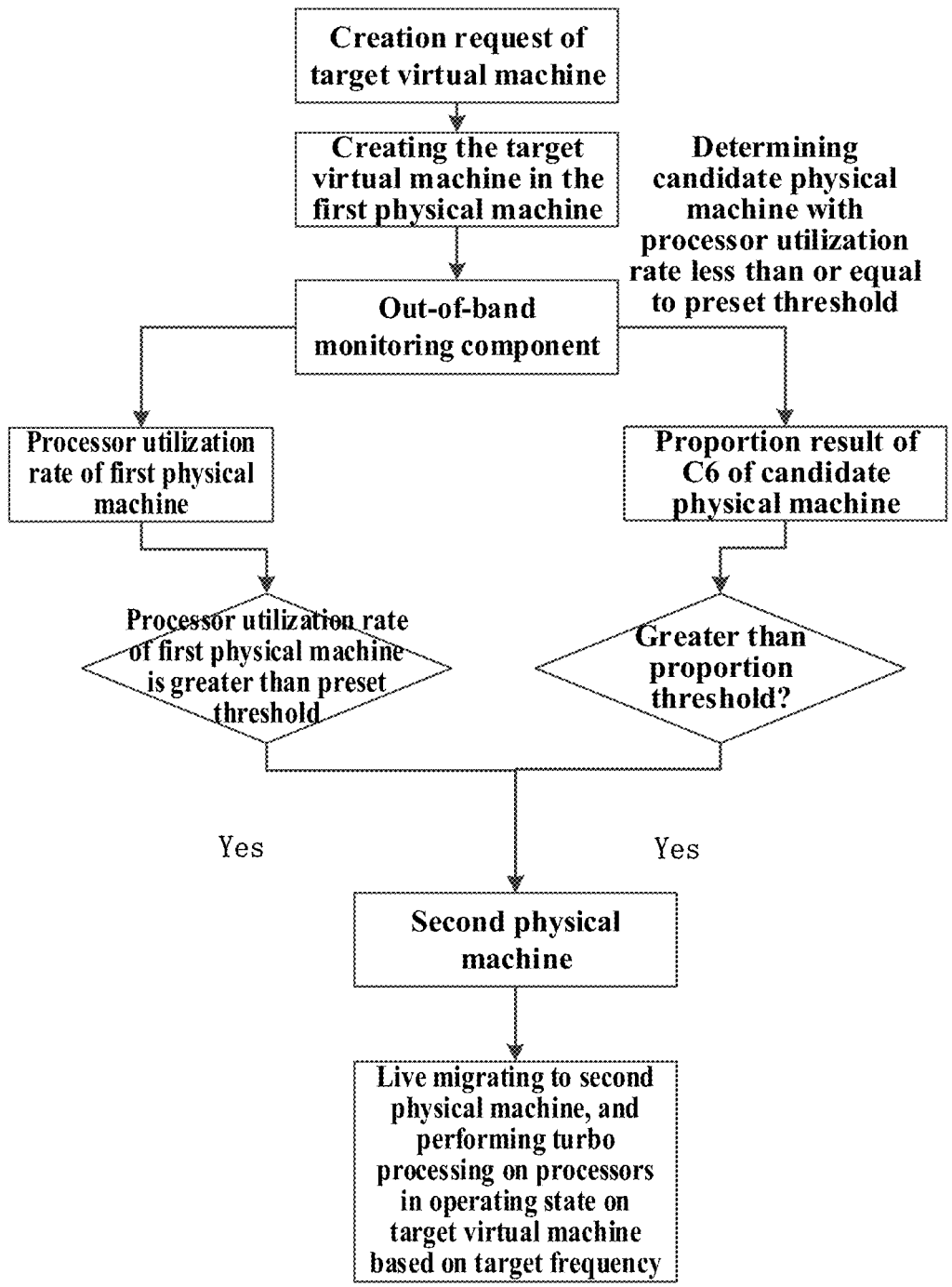
FIG. 4 illustrates a flowchart of a yet further virtual machine operation controlling method provided by embodiments of the present disclosure.

Referring to FIG. 4, in the embodiment, in response to a creation request of a target virtual machine, the target virtual machine is created based on at least one processor on a first physical machine in a server cluster, where an upper limit of a processor operating frequency of the target virtual machine is set as a target frequency; processor utilization rates of processors in an operating state on a plurality of physical machines (including a first physical machine and other physical machines) in a server cluster are monitored by an out-of-band monitoring component or the like, and each of the processor utilization rates is compared with a preset threshold; if the processor utilization rate of the first physical machine exceeds the preset threshold, sleep levels corresponding to the processors in the idle state on the other physical machines are obtained, and a second physical machine is determined in the server cluster based on the sleep levels (where candidate physical machines each with a processor utilization rate less than the preset threshold are determined in the server cluster according to the processor utilization rates, and a second physical machine is determined from the candidate physical machines). In the present embodiment, a C6 level to be detected and a corresponding proportion threshold are determined based on a corresponding relationship between the sleep level and the sleep power consumption; a proportion result between processors corresponding to the C6 level on the candidate physical machine and the processors in the idle state is detected; the proportion result is compared with the proportion threshold; a second physical machine satisfying the preset handover condition is determined based on the comparison result, i.e., a second physical machine having a low load is selected based on the processor utilization rate and the sleep power consumption corresponding to the processors in the idle state; the target virtual machine is migrated to the second physical machine with a low load according to the live migration capability, so as to guarantee that the processors in the operating state in the target virtual machine can operate in a non-operating frequency greater than 3.1 GHz, and thereby achieving greater processing performance.

Figure 5:
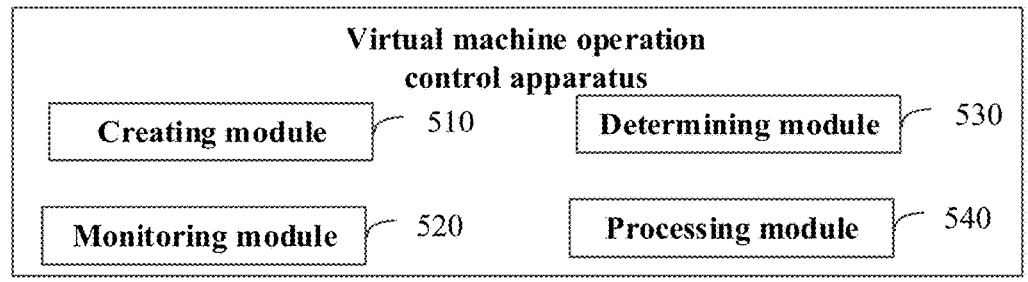
FIG. 5 illustrates a schematic diagram of a structure of a virtual machine operation controlling apparatus provided by embodiments of the present disclosure.

In order to implement the above-mentioned embodiments, the present disclosure further provides a virtual machine operation controlling apparatus. FIG. 5 illustrates a schematic diagram of a structure of a virtual machine operation controlling apparatus provided by embodiments of the present disclosure. The apparatus can be implemented by software and/or hardware, which is typically integrated in an electronic device to achieve processor performance adjustment. As shown therein, the apparatus includes: a creating module 510, a monitoring module 520, a determining module 530 and a processing module 540, wherein:

the creating module 510 is configured to create a target virtual machine based on at least one processor on a first physical machine in a server cluster in response to a creation request of the target virtual machine, where an upper limit of a processor operating frequency of the target virtual machine is set as a target frequency;

the monitoring module 520 is configured to monitor a processor utilization rate of processors in an operating state of the first physical machine is in an operating state, the determining module 530 is configured to select a second physical machine satisfying a preset handover condition from the server cluster based on sleep levels corresponding to processors in an idle state on other physical machines in the server cluster in an event that the processor utilization rate of the first physical machine exceeds a preset threshold, where the preset handover condition is that a sleep power consumption corresponding to processors in an idle state on a physical machine meets a preset heat release index that reflects a processor in an operating state has a turbo capability; and the processing module 540 is configured to migrate the target virtual machine from the first physical machine to the second physical machine, and perform, based on the target frequency, turbo processing on a processor in an operating state on the target virtual machine.

The virtual machine operation controlling apparatus provided by the embodiments of the present disclosure can perform the virtual machine operation controlling method provided by any of the embodiments of the present disclosure, which includes corresponding functional modules for performing the method and has the advantageous effects (details thereof are omitted here for brevity).

In order to implement the above-mentioned embodiments, the present disclosure further provides a computer program product having computer programs/instructions configured to perform the virtual machine operation controlling method according to the above-mentioned embodiments when executed by a processor.

Figure 6:
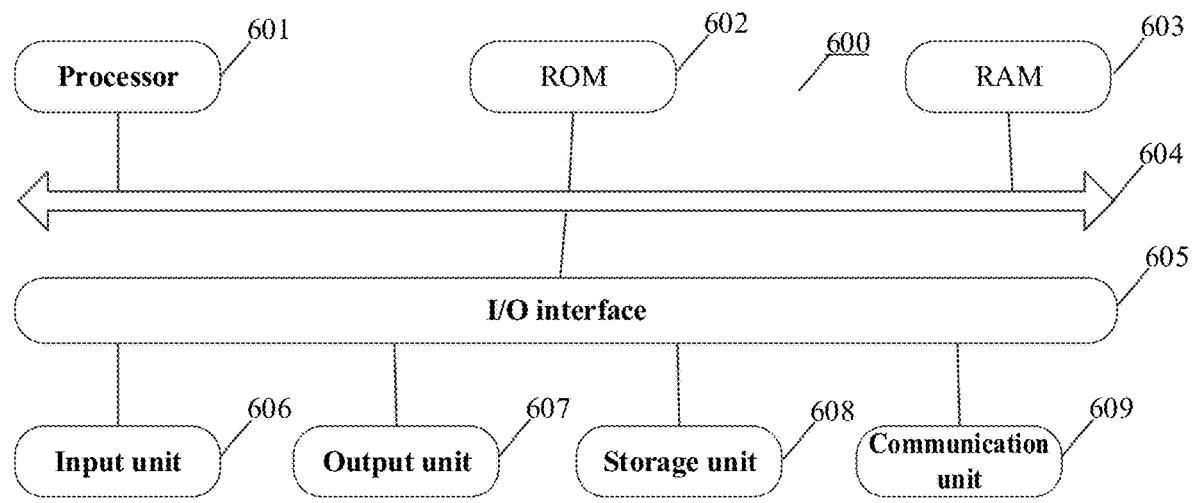
FIG. 6 illustrates a schematic diagram of a structure of an electronic device provided by embodiments of the present disclosure.

FIG. 6 illustrates a schematic diagram of a structure of an electronic device 600 provided by embodiments of the present disclosure.

Reference below will be made to FIG. 6 which illustrates a structural schematic diagram of an electronic device 600 adapted to implement embodiments of the present disclosure. The electronic device 600 according to the embodiments of the present disclosure may include, but is not limited to, a mobile terminal such as a mobile phone, a laptop computer, a digital broadcast receiver, a Personal Digital Assistant (PDA), a Portable Android Device (PAD), a Portable Media Player (PMP), an on-vehicle terminal (e.g. an on-vehicle navigation terminal) or the like, or a fixed terminal such as a digital TV, a desktop computer or the like. The electronic device as shown in FIG. 6 is provided merely as an example, without suggesting any limitation to the functions and the application range of the embodiments of the present disclosure.

As shown therein, the electronic device 600 may include a processor (e.g. a central processor, a graphics processor or the like) 601, which can execute various acts and processing based on programs stored in a Read Only Memory (ROM) 602 or a program loaded from a storage unit 608 to a Random Access Memory (RAM) 603. RAM 603 stores therein various programs and data required for operations of the electronic device 600. The processor 601, the ROM 602 and the RAM 603 are connected to one another via a bus 604. An input/output (I/O) interface 605 is also connected to the bus 604.

Typically, the following units may be connected to the I/O interface 605: an input unit 606 including, for example, a touchscreen, a touch pad, a keyboard, a mouse, a camera, a microphone, an accelerometer, a gyroscope and the like; an output unit 607 including, for example, a Liquid Crystal Display (LCD), a loudspeaker, a vibrator and the like; a storage unit 608 including, for example, a tape, a hard drive and the like; and a communication unit 609. The communication unit 609 can allow wireless or wired communication of the electronic device 600 with other devices to exchange data. Although FIG. 6 shows the electronic device 600 including various units, it would be appreciated that not all of the units as shown are required to be implemented or provided. Alternatively, more or fewer units may be implemented or provided.

According to embodiments of the present disclosure, the processes described above with reference to the flowcharts may be implemented as computer software programs. For example, embodiments of the present disclosure include a computer program product comprising a computer program carried on a computer readable medium, the computer program containing program code for performing the methods as in the flowcharts. In those embodiments, the computer program may be downloaded and installed from a network via the communication unit 609, or may be installed from the storage unit 608, or may be installed from the ROM 602. The computer program, when executed by the processor 601, performs the above-described functions defined in the virtual machine operation controlling method according to the embodiments of the present disclosure.

It should be noted that the computer readable medium according to the present disclosure may be a computer readable signal medium or a computer readable storage medium or any combination of the two. The computer readable storage medium may be, for example, but not limited to, an electronic, magnetic, optical, electromagnetic, infrared, or semiconductor system, apparatus, or device, or any combination of the foregoing. More specific examples of the computer readable storage medium may include, but are not limited to: an electrical connection having one or more wires, a portable computer diskette, a hard disk, an RAM, an ROM, an erasable programmable read-only memory (EPROM or flash memory), an optical fiber, a portable compact disc read-only memory (CD-ROM), an optical storage device, a magnetic storage device, or any suitable combination of the foregoing. In the present disclosure, a computer readable storage medium may be any tangible medium that can contain, or store, a program for use by or in connection with an instruction execution system, apparatus, or device. In contrast, in the present disclosure, a computer readable signal medium may include a propagated data signal with computer readable program code embodied therein, either in baseband or as part of a carrier wave. Such propagated data signal may take many forms, including, but not limited to, an electro-magnetic signal, an optical signal, or any suitable combination thereof. A computer readable signal medium may also be any computer readable medium that is not a computer readable storage medium and that can communicate, propagate, or transmit a program for use by or in connection with an instruction execution system, apparatus, or device. Program code embodied on a computer readable medium may be transmitted using any appropriate medium, including but not limited to: electrical wires, optical cables, RF (radio frequency), etc., or any suitable combination of the foregoing.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example, the internet), a peer-to-peer network (e.g. ad hoc peer-to-peer network), and any known network or network to be developed.

The computer-readable medium may be the one included in the electronic device, or may be provided separately, rather than assembled in the electronic device.

The computer-readable medium carries one or more programs which, when executed by the electronic device, cause the electronic device to:

in response to a creation request of a target virtual machine, create the target virtual machine based on at least one processor on a first physical machine in a server cluster, wherein an upper limit of a processor operating frequency of the target virtual machine is set as a target frequency; monitor a processor utilization rate of processors in an operating state of the first physical machine, and in an event that the processor utilization rate of the first physical machine exceeds a preset threshold, select a second physical machine satisfying a preset handover condition from the server cluster based on sleep levels corresponding to processors in an idle state on other physical machines in the server cluster, wherein the preset handover condition is that a sleep power consumption corresponding to processors in an idle state on a physical machine meets a preset heat release index that reflects a processor in an operating state has a turbo capability; migrate the target virtual machine from the first physical machine to the second physical machine, and perform, based on the target frequency, turbo processing on a processor in an operating state on the target virtual machine.

The electronic device may have computer program codes for performing operations of the present disclosure may be written by using one or more program design language or any combination. The program design language includes, but is not limited to, object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowchart and block diagrams in the drawings illustrate the architecture, functionality and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems which perform the specified functions or acts, or combinations of special purpose hardware and computer instructions.

The units described in the embodiments of the present disclosure may be implemented by software or hardware. Wherein, the designation of a module or unit does not in some cases constitute a limitation to the unit itself.

The functions described above may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chip (SOCs), Complex Programmable Logic Devices (CPLDs), and the like.

In the context of this disclosure, a machine-readable medium may be a tangible medium that can contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of a computer-readable storage medium would include an electrical connection based on one or more wires, a portable computer diskette, a hard disk, an RAM, an ROM, an EPROM or flash memory, an optical fiber, a CD-ROM, an optical storage device, a magnetic storage device, or any suitable combination of the foregoing.

Above described are only optimal embodiments of the present disclosure and the technical principles applied therein. It would be appreciated by those skilled in the art that the scope of the disclosure herein is not limited to the particular combination of features described above, but also encompasses other embodiments in which any combination of the features described above or their equivalents does not depart from the spirit of the disclosure. For example, the above features and (but not limited to) the features disclosed in this disclosure having similar functions are replaced with each other to form the technical solution.

Further, while operations are depicted in a particular order, this should not be understood as requiring that such operations be performed in the particular order shown or in sequential order. In certain circumstances, multitasking and parallel processing may be advantageous. Likewise, while several specific implementation details are contained in the above discussions, these should not be construed as limitations on the scope of the present disclosure, but rather as descriptions of features that may be specific to particular implementations. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure specified in the appended claims is not necessarily limited to the specific features or acts described above. Rather, the specific features and acts described above are disclosed as example forms of implementing the claims.

We claim:

1. A virtual machine operation controlling method, comprising:
   in response to a creation request of a target virtual machine, creating the target virtual machine based on at least one processor on a first physical machine in a server cluster comprising a plurality of physical machines, each physical machine executing at least one or more virtual machines, wherein a limit of a processor operating frequency of the target virtual machine is set as a target frequency;
   receiving sleep levels sent by virtual machines on other physical machines in the server cluster when detecting that corresponding processors are in the idle state, wherein the sleep levels are is determined by the virtual machines based on a candidate sleep level and an operating service;
   determining, in the server cluster, at least one candidate physical machines from the other physical machines in the server cluster with a processor utilization rate less than a preset threshold;
   monitoring a processor utilization rate of processors in an operating state of the first physical machine;
   in response to determining that the processor utilization rate of the first physical machine exceeds the preset threshold, selecting a second physical machine, from the at least one candidate physical machine, satisfying a preset handover condition from the server cluster based on sleep levels corresponding to processors in an idle state on the other physical machines in the server cluster, wherein the preset handover condition is that a sleep power consumption corresponding to a processor in an idle state on the second physical machine meets a preset heat release index released by the processor in the idle state that reflects the processor in the idle state on the second physical machine, after turning into in an operating state, has a turbo capability against the processors in the operating state on the first physical machine, and the turbo capability supports the processor in the operating state on the second physical machine to operate at the target frequency; and
   migrating the target virtual machine from the first physical machine to the second physical machine, and performing, based on the target frequency, turbo processing on a processor in an operating state on the migrated target virtual machine.

2. The method of claim 1, wherein in response to the creation request of the target virtual machine, creating the target virtual machine based on the at least one processor on the first physical machine in the server cluster, comprises:
   receiving a creation request of a virtual machine, wherein the creation request comprises:
   a processor number, and a processor performance type;
   determining whether the processor performance type is a target type, wherein the target type indicates that a limit of a processor operating frequency corresponding to a virtual machine to be configured is set as the target frequency; and
   selecting, on the first physical machine, processors matching the processor number, to create the target virtual machine.

3. The method of claim 1, prior to selecting the second physical machine satisfying the preset handover condition from the server cluster based on the sleep levels corresponding to the processors in the idle state on other physical machines in the server cluster, further comprising:
  after creating a virtual machine corresponding to processors on a physical machine in the server cluster, obtaining the candidate sleep level supported by a processor in an idle state on other physical machines in the server cluster, and reporting to the virtual machine the candidate sleep level when the processors are in the idle state;
  monitoring, by the virtual machines, operating states corresponding to processors on the other physical machines, respectively.

4. The method of claim 1, wherein selecting the second physical machine satisfying the preset handover condition from the server cluster based on the sleep levels corresponding to the processors in the idle state on other physical machines in the server cluster comprises:
  obtaining a sleep level corresponding to processors in the idle state on the candidate physical machine; and
  selecting the second physical machine satisfying the preset handover condition from the server cluster, based on the sleep level corresponding to the processors in the idle state on the candidate physical machine.

5. The method of claim 4, wherein determining, in the server cluster, the candidate physical machines with the processor utilization rate less than the preset threshold comprises:
  obtaining a processor utilization rate corresponding to the target virtual machine which is executing in the first physical machine, and detecting whether the processor utilization rate corresponding to the target virtual machine is greater than a first threshold which is preset, wherein the first threshold is greater than the preset threshold; and
  in response to obtaining that the processor utilization rate corresponding to the target virtual machine is greater than a processor utilization rate corresponding to the preset threshold, determining a second threshold of the processor utilization rate less than the processor utilization rate corresponding to the preset threshold.

6. The method of claim 4, wherein selecting the second physical machine satisfying the preset handover condition from the server cluster, based on the sleep level corresponding to the processors in the idle state on the candidate physical machine, comprises:
  determining a target sleep level to be detected and a proportion threshold corresponding the target sleep level based on a corresponding relationship between a sleep level and a sleep power consumption;
  detecting a proportion result between processors corresponding to the target sleep level on the candidate physical machine and processors in the idle state; comparing the proportion result with the proportion threshold, and determining a target candidate physical machine based on a comparison result, wherein the proportion result corresponding to the target candidate physical machine is greater than the proportion threshold; and
  determining at least one of the target candidate physical machines as the second physical machine satisfying the preset handover condition.

7. The method of claim 1, after monitoring the processor utilization rate of processors in an operating state of the first physical machine, further comprising:
  in response to obtaining that the processor utilization rate of the first physical machine is less than the preset threshold, detecting whether a sleep level corresponding to the processors in the idle state on the first physical machine meet the preset handover condition; and
  in response to obtaining that the sleep level corresponding to the processors in the idle state on the first physical machine meet the preset handover condition, selecting a second physical machine satisfying the handover condition from the server cluster.

8. The method of claim 7, wherein detecting whether the sleep level corresponding to the processors in the idle state on the first physical machine meets the preset handover condition, comprises:
  obtaining setting information of a processor sleep level on the first physical machine;
  determining, based on the setting information, whether the processor sleep level is limited as a first sleep level, where the first sleep level indicates a respective processor in the operating state does not have a turbo capability; and
  in response to obtaining that the processor sleep level is limited as the first sleep level, determining that the sleep level corresponding to the processors in the idle state on the first physical machine meets the preset handover condition.

9. The method of claim 8, further comprising:
  in response to obtaining that the processor sleep level is not limited as the first sleep level, obtaining the sleep level corresponding to the processors in the idle state on the first physical machine;
  determining, based on a corresponding relationship between the sleep level and the sleep power consumption, a target sleep level to be detected and a proportion threshold corresponding to the target sleep level;
  detecting a proportion result between processors corresponding to the target sleep level on the first physical machine and processors in the idle state, and comparing the proportion result with the proportion threshold;
  in response to determining that the proportion result is less than the proportion threshold, determining that the sleep level corresponding to the processors in the idle state on the first physical machine meets the preset handover condition; and
  in response to determining that the proportion result is greater than or equal to the proportion threshold, determining that the sleep level corresponding to the processors in the idle state on the first physical machine does not meet the preset handover condition.

10. The method of claim 7, further comprising:
  in response to obtaining that the sleep level corresponding to the processors in the idle state on the first physical machine, performing, based on the target frequency, turbo processing on a processor in an operating state on the target virtual machine.

11. An electronic device, comprising:
  a processor;
  a memory for storing executable instructions by the processor;
  wherein the processor is configured to read the executable instructions from the memory and execute the executable instructions to cause the device to:
    in response to a creation request of a target virtual machine, create the target virtual machine based on at least one processor on a first physical machine in a server cluster comprising a plurality of physical machines, each physical machine executing at least one or more virtual machines, wherein a limit of a processor operating frequency of the target virtual machine is set as a target frequency;

receive sleep levels sent by virtual machines on other physical machines in the server cluster when detecting that corresponding processors are in the idle state, wherein the sleep levels are is determined by the virtual machines based on a candidate sleep level and an operating service;

determine, in the server cluster, at least one candidate physical machine from the other physical machines in the server cluster with a processor utilization rate less than a preset threshold;

monitor a processor utilization rate of processors in an operating state of the first physical machine;

in response to determining that the processor utilization rate of the first physical machine exceeds the preset threshold, select a second physical machine, from the at least one candidate physical machine, satisfying a preset handover condition from the server cluster based on sleep levels corresponding to processors in an idle state on the other physical machines in the server cluster, wherein the preset handover condition is that a sleep power consumption corresponding to a processor in an idle state on the second physical machine meets a preset heat release index released by the processor in the idle state that reflects the processor in the idle state on the second physical machine, after turning into in an operating state, has a turbo capability against the processors in the operating state on the first physical machine, and the turbo capability supports the processor in the operating state on the second physical machine to operate at the target frequency; and migrate the target virtual machine from the first physical machine to the second physical machine, and perform, based on the target frequency, turbo processing on a processor in an operating state on the migrated target virtual machine.

12. The device of claim 11, wherein in response to the creation request of the target virtual machine, creating the target virtual machine based on the at least one processor on the first physical machine in the server cluster, comprises:

receiving a creation request of a virtual machine, wherein the creation request comprises: a processor number, and a processor performance type;

determining whether the processor performance type is a target type, wherein the target type indicates that a limit of a processor operating frequency corresponding to a virtual machine to be configured is set as the target frequency; and selecting, on the first physical machine, processors matching the processor number, to create the target virtual machine.

13. The device of claim 11, prior to selecting the second physical machine satisfying the preset handover condition from the server cluster based on the sleep levels corresponding to the processors in the idle state on other physical machines in the server cluster, the device is further caused to:

after creating a virtual machine corresponding to processors on a physical machine in the server cluster, obtain the candidate sleep level supported by a processor in an idle state on other physical machines in the server cluster, and report to the virtual machine the candidate sleep level when the processors are in the idle state; and monitor, by the virtual machines, operating states corresponding to processors on the other physical machines, respectively; and.

14. The device of claim 11, wherein selecting the second physical machine satisfying the preset handover condition from the server cluster based on the sleep levels corresponding to the processors in the idle state on other physical machines in the server cluster comprises:

obtaining a sleep level corresponding to processors in the idle state on the candidate physical machine; and selecting the second physical machine satisfying the preset handover condition from the server cluster, based on the sleep level corresponding to the processors in the idle state on the candidate physical machine.

15. The device of claim 14, wherein determining, in the server cluster, the candidate physical machines with the processor utilization rate less than the preset threshold comprises:

obtaining a processor utilization rate corresponding to the target virtual machine which is executing in the first physical machine, and detecting whether the processor utilization rate corresponding to the target virtual machine is greater than a first threshold which is preset, wherein the first threshold is greater than the preset threshold; and in response to obtaining that the processor utilization rate corresponding to the target virtual machine is greater than a processor utilization rate corresponding to the preset threshold, determining a second threshold of the processor utilization rate less than the processor utilization rate corresponding to the preset threshold.

16. The device of claim 14, wherein selecting the second physical machine satisfying the preset handover condition from the server cluster, based on the sleep level corresponding to the processors in the idle state on the candidate physical machine, comprises:

determining a target sleep level to be detected and a proportion threshold corresponding to the target sleep level based on a corresponding relationship between a sleep level and a sleep power consumption;

detecting a proportion result between processors corresponding to the target sleep level on the candidate physical machine and processors in the idle state;

comparing the proportion result with the proportion threshold, and determining a target candidate physical machine based on a comparison result, wherein the proportion result corresponding to the target candidate physical machine is greater than the proportion threshold; and determining at least one of the target candidate physical machines as the second physical machine satisfying the preset handover condition.

17. The device of claim 11, after monitoring the processor utilization rate of processors in an operating state of the first physical machine, the device is further caused to:

in response to obtaining that the processor utilization rate of the first physical machine is less than the preset threshold, detect whether a sleep level corresponding to the processors in the idle state on the first physical machine meet the preset handover condition; and in response to obtaining that the sleep level corresponding to the processors in the idle state on the first physical machine meet the preset handover condition, select a second physical machine satisfying the handover condition from the server cluster.

18. The device of claim 17, wherein detecting whether the sleep level corresponding to the processors in the idle state on the first physical machine meets the preset handover condition, comprises:
   obtaining setting information of a processor sleep level on the first physical machine;
   determining, based on the setting information, whether the processor sleep level is limited as a first sleep level, where the first sleep level indicates a respective processor in the operating state does not have a turbo capability; and
   in response to determining obtaining that the processor sleep level is limited as the first sleep level, determining that the sleep level corresponding to the processors in the idle state on the first physical machine meets the preset handover condition.

19. The device of claim 18, wherein the device is further caused to:
   in response to determining obtaining that the processor sleep level is not limited as the first sleep level, obtain the sleep level corresponding to the processors in the idle state on the first physical machine;
   determine, based on a corresponding relationship between the sleep level and the sleep power consumption, a target sleep level to be detected and a proportion threshold corresponding to the target sleep level;
   detect a proportion result between processors corresponding to the target sleep level on the first physical machine and processors in the idle state, and compare the proportion result with the proportion threshold;
   in response to determining that the proportion result is less than the proportion threshold, determine that the sleep level corresponding to the processors in the idle state on the first physical machine meets the preset handover condition; and
   in response to determining that the proportion result is greater than or equal to the proportion threshold, determine that the sleep level corresponding to the processors in the idle state on the first physical machine does not meet the preset handover condition.

20. A non-transitory computer readable storage medium, wherein the computer readable storage medium stores computer programs, when executed, cause a device to:
   in response to a creation request of a target virtual machine, create the target virtual machine based on at least one processor on a first physical machine in a server cluster comprising a plurality of physical machines, each physical machine executing at least one or more virtual machines, wherein a limit of a processor operating frequency of the target virtual machine is set as a target frequency;
   receive sleep levels sent by virtual machines on other physical machines in the server cluster when detecting that corresponding processors are in the idle state, wherein the sleep levels are is determined by the virtual machines based on a candidate sleep level and an operating service;
   determine, in the server cluster, at least one candidate physical machine from the other physical machines in the server cluster with a processor utilization rate less than a preset threshold;
   monitor a processor utilization rate of processors in an operating state of the first physical machine; and
   in response to determining that the processor utilization rate of the first physical machine exceeds the preset threshold, select a second physical machine, from the at least one candidate physical machine, satisfying a preset handover condition from the server cluster based on sleep levels corresponding to processors in an idle state on the other physical machines in the server cluster, wherein the preset handover condition is that a sleep power consumption corresponding toa processor in an idle state on the second physical machine meets a preset heat release index released by the processor in the idle state that reflects the processor in the idle state on the second physical machine, after turning into in an operating state, has a turbo capability against the processors in the operating state on the first physical machine, and the turbo capability supports the processor in the operating state on the second physical machine to operate at the target frequency; and
   migrate the target virtual machine from the first physical machine to the second physical machine, and perform, based on the target frequency, turbo processing on a processor in an operating state on the migrated target virtual machine.

21. The non-transitory computer readable storage medium of claim 20, wherein in response to the creation request of the target virtual machine, creating the target virtual machine based on the at least one processor on the first physical machine in the server cluster, comprises:
   receiving a creation request of a virtual machine, wherein the creation request comprises: a processor number, and a processor performance type;
   determining whether the processor performance type is a target type, wherein the target type indicates that a limit of a processor operating frequency corresponding to a virtual machine to be configured is set as the target frequency; and
   selecting, on the first physical machine, processors matching the processor number, to create the target virtual machine.

* * * * *